US010880507B2

(12) United States Patent
Zhang

(10) Patent No.: US 10,880,507 B2
(45) Date of Patent: Dec. 29, 2020

(54) IMAGING METHOD AND TERMINAL FOR NOISE REDUCTION

(71) Applicant: YULONG COMPUTER TELECOMMUNICATION SCIENTIFIC (SHENZHEN) CO., LTD., Shenzhen (CN)

(72) Inventor: Lei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 11 days.

(21) Appl. No.: 16/067,127

(22) PCT Filed: Sep. 28, 2016

(86) PCT No.: PCT/CN2016/100548
§ 371 (c)(1),
(2) Date: Jun. 29, 2018

(87) PCT Pub. No.: WO2017/113917
PCT Pub. Date: Jul. 6, 2017

(65) Prior Publication Data
US 2019/0014275 A1    Jan. 10, 2019

(30) Foreign Application Priority Data
Dec. 29, 2015 (CN) .......................... 2015 1 1015683

(51) Int. Cl.
*H04N 5/357* (2011.01)
*G06T 5/50* (2006.01)
(Continued)

(52) U.S. Cl.
CPC .............. *H04N 5/357* (2013.01); *G06T 5/002* (2013.01); *G06T 5/50* (2013.01); *H04N 5/232* (2013.01);
(Continued)

(58) Field of Classification Search
CPC ........ H04N 5/217; H04N 5/232; H04N 5/357; H04N 5/23232; G06T 5/002; G06T 5/20; G06T 2207/20221; G06T 2207/20216
See application file for complete search history.

(56) References Cited

U.S. PATENT DOCUMENTS 8,194,153 B2 *   6/2012   Asoma ................... H04N 5/235
                                                    348/221.1
8,233,062 B2 *   7/2012   Mitsuya .................... G06T 5/50
                                                    348/241
(Continued)

FOREIGN PATENT DOCUMENTS

CN        102682438 A       9/2012
CN        102714699 A      10/2012
(Continued)

*Primary Examiner* — Cynthia Segura
(74) *Attorney, Agent, or Firm* — ScienBiziP, P.C.

(57) ABSTRACT

An imaging method applied to an image device and to a terminal containing the image device includes determining a brightness of an environment background of an object to be shot; determining a number of images of the object to be shot continuously according to a relationship between the brightness of the environment background, a preset brightness, and the number of the images continuously shot. A noise reduction process is carried out on the images continuously shot to complete an imaging process. All images continuously shot are processed to expand an original information amount of the images. Image definition is not reduced in the noise-canceling process, and a high-quality image can be achieved even under a weak light conditions.

6 Claims, 4 Drawing Sheets

(51) Int. Cl.
   *H04N 5/232*   (2006.01)
   *G06T 5/00*   (2006.01)
(52) U.S. Cl.
   CPC ............... *G06T 2207/20216* (2013.01); *G06T 2207/20221* (2013.01)

(56) References Cited

U.S. PATENT DOCUMENTS

| | | | | |
|---|---|---|---|---|
| 8,311,282 | B2* | 11/2012 | Luo | ......... G06T 5/003 |
| | | | | 382/103 |
| 9,521,334 | B2* | 12/2016 | Yamamoto | ............ H04N 5/235 |
| 10,341,553 | B2* | 7/2019 | Jones | |
| 2008/0088710 | A1* | 4/2008 | Iwamoto | ........... H04N 1/32128 |
| | | | | 348/220.1 |

FOREIGN PATENT DOCUMENTS

| | | | | | |
|---|---|---|---|---|---|
| CN | 105635575 | A | | 6/2016 | |
| JP | 2008141675 | A | | 6/2008 | |
| JP | 2009-152803 | A | * | 7/2009 | ............... G03B 5/00 |
| JP | 2009152803 | A | | 7/2009 | |

\* cited by examiner

IMAGING METHOD AND TERMINAL FOR NOISE REDUCTION

CROSS-REFERENCE TO RELATED APPLICATIONS

The present disclosure claims a priority of a Chinese patent application, which is filed to Chinese patent office on Dec. 29, 2015, named "an imaging method, an imaging device and a terminal," and numbered 201511015683.9. All contents of Chinese patent application are hereby incorporated by reference in the present application.

FIELD

The present disclosure relates to terminals, in particular to an imaging method, an imaging device, and a terminal.

BACKGROUND

In the process of obtaining and transmitting a digital image, noise is often generated due to various interferences. For example, luminosities and sensors during shooting by a digital image acquisition device is one of important factors of generating an image noise. Image noise can cause signal distortion that adversely influence judgments to real signals.

Images obtained in a weak light environment are low in light and brightness, Thus, when amplifying the brightness of the image, the noise will is also amplified. The noise may than be obviously noticeable in the image. Therefore, noise needs to be reduced or prevented.

In the related art, continuous shooting and synthesis of an image are usually adopted, to solve the problem of noise in weak light. Generally, a number of images for continuous shooting is preset. Once a weak light environment is detected, continuous shooting and synthesis are adopted on the object to be shot according to the preset number of images. Noise can be restrained through a later-stage image processing technology, for example, a Gaussian smoothing process (which carries out a weighted averaging on the whole image, enables the value of each pixel point to be equal to a weighted averaging on the pixel point itself and other neighboring pixel points), a median filtering (which sets the value of each pixel point to be a median grayscale value of all the pixel points in a certain adjacent window of the pixel points), and the like.

The technical scheme above has various defects:

(1) According to the Shannon Information Theory, when multi-stage processing is carried out on the image, a part of information is likely to be lost at each processing stage. Therefore, when the above processing technology is used for imaging, due to the constraints of the data processing theorem, information amount of the image is reduced, the sharpness is reduced, the definition is reduced, and the like.

(2) Influence of brightness factors on the number of the continuous shooting is not considered in the continuous shooting process, so that the imaging quality is seriously and adversely influenced.

Therefore, an imaging scheme for restraining noise in a weak light environment becomes a problem.

SUMMARY

Based on at least one of the above technical problems, the present disclosure provides a novel imaging scheme, which determines a number of images for continuously shooting on an object to be shot according to a relation between an ambient background brightness, a preset brightness and the number of images. The present disclosure further carries out a noise reduction process on the images, to complete an imaging process. The present disclosure processes the images continuously shot, thus, an original amount of information in the images is expanded, an image definition is prevented from being reduced in the noise reduction process, and a high-quality image can be achieved even under a weak light condition.

An imaging method is presented. The imaging method includes: determining a brightness of an environment background of an object to be shot; determining a number of images continuously shot on the object, according to a relation between the brightness of the environment background, a preset brightness, and the number of the images; and carrying out a noise reduction process on the images, to complete an imaging process.

In the embodiment, the number of the images continuously shot is determined according to the relation between the brightness of the environment background, the preset brightness, and the number of images. The noise reduction process is carried out on the images continuously shot, to complete the imaging process. By processing the images continuously shot, an original amount of information in the images can be expanded, an image definition can be prevented from being reduced in the noise reduction process. Thus, a high-quality image can be achieved even under a weak light condition.

The above embodiment, preferably, before determining a brightness of an environment background of an object to be shot, further includes: presetting a negative correlation between the brightness of the environment background and the number of the images; and storing the negative correlation.

In the embodiment, the negative correlation refers to a change of directions of two phenomena opposite to each other. The brightness of the environment background and the number of the images continuously shot being in a negative correlation means that, the weaker the light, the higher the brightness amplification ratio, the greater the amount of noise, and the larger the number of images to be shot. When the number of the images is great enough, loss of image information quantity is avoided.

In the embodiment, preferably, carrying out a noise reduction process on the images, to complete an imaging process includes: computing an average noise power of the images, to complete the noise reduction process; and synthesizing the images according to the average noise power, to complete the imaging process.

In the embodiment, it is assumed that the number of the images continuously shot is N, the images continuously shot are $\{P_1, P_2, \ldots P_N\}$, an image finally synthesized is P. It is assumed that an original static scene is $s_i$. In a continuous shooting process, each $s_i$ is the same as there is no movement of the scene. It is set that s and $n_i$ are noises in an image finally synthesized, where n is a random noise introduced by a photographing equipment, and a satisfied expected value of the random noise is 0, and variance is a normal distribution of $\sigma^2$. This formula applies:

$$P_i = s_i + n_i;$$

$$P = \frac{1}{N}\sum_{i=1}^{N} P_i = \frac{1}{N}\sum_{i=1}^{N} s + \frac{1}{N}\sum_{i=1}^{N} n_i = s + n;$$

$$n = \frac{1}{N}\sum_{i=1}^{N} n_i.$$

It is assumed that the variance in the image finally synthesized is D (n). The variance is the normal distribution of $\sigma^2$, and N is a constant in the calculation process, thus:

$$D(n_i) = \sigma^2;$$

$$D(n) = D\left(\frac{1}{N}\sum_{i=1}^{N} n_i\right) = \frac{1}{N^2}D\left(\sum_{i=1}^{N} n_i\right) = \frac{1}{N^2}\sum_{i=1}^{N} D(n_i) = \frac{1}{N^2}\sum_{i=1}^{N} \sigma^2 = \frac{1}{N^2}\sigma^2.$$

After N images in one static scene are overlapped and averaged, the noise power of the images is 1/N of the original. By carrying out a synthesis on the images continuously shot using an average noise power, a large amount of noises caused by the environmental background is effectively inhibited, thus a final image with good quality is obtained.

The above embodiment, preferably before determining a brightness of an environment background of an object to be shot, further includes: collecting a reference image of the object.

In the embodiment, the imaging quality under the weak light environment is further optimized, by collecting the reference image of the object and self-adapting of the brightness in the shooting scene.

In the above embodiment, preferably determining a number of images continuously shot of the object, according to a relation between the brightness of the environment background, a preset brightness, and the number of the images, includes: determining an average brightness value and a mean grayscale value of the reference image; constructing a fraction which has a numerator of the mean grayscale value and has a denominator of the average brightness value, rounding the fraction to obtain an integer, and determining the integer as the number of the images continuously shot of the object to be shot.

In the embodiment, another method of determining the number N of the images continuously shot is provided. An image is shot before continuous shooting, where the image is taken as a reference image. The average brightness value L of the reference image is calculated. A formula N=[M/L] is used, where [M/L] is a rounding operation, and M is ½ of a grayscale level of the reference image. For example, grayscale ranges from 0 to 255. The number of the images continuously shot is N=11, when M=128, and L=12. A photographing system normally adjusts the brightness of the weak light image to be M/L times, thus, [M/L] images continuously shot are needed to reduce the noise to the original level, and to avoid interference such as noise amplification during imaging.

The second embodiment of the present disclosure further provides an imaging device. The imaging device includes a determination unit, which determines a brightness of an environment background of an object to be shot. The determination unit further determines a number of images continuously shot on the object, according to a relation between the brightness of the environment background, a preset brightness, and the number of the images. The imaging device further includes a noise reduction unit, which carries out a noise reduction process on the images, to complete an imaging process.

In the embodiment, the number of the images continuously shot is determined according to the relation between the brightness of the environment background, the preset brightness, and the number of images. The noise reduction process is carried out on the images continuously shot, to complete the imaging process. By processing the images continuously shot, an original amount of information in the images can be expanded, an image definition can be prevented from being reduced in the noise reduction process. Thus, a high-quality image can be achieved even under a weak light condition.

In the above embodiment, preferably, the imaging device further includes a presetting unit, which presets a negative correlation between the brightness of the environment background and the number of the images; and storing the negative correlation.

In the embodiment, the negative correlation refers to a change of directions of two phenomena opposite to each other. The brightness of the environment background and the number of the images continuously shot being in a negative correlation means that, the weaker the light, the higher the brightness amplification ratio, the greater the amount of noise, and the larger the number of images to be shot. When the number of the images is great enough, loss of image information quantity is avoided.

In the embodiment, preferably, the imaging device further includes: a calculation unit, which computes an average noise power of the images, to complete the noise reduction process. The imaging device further includes a synthesizing unit, which synthesizes the images according to the average noise power, to complete the imaging process.

In the embodiment, it is assumed that the number of the images continuously shot is N, the images continuously shot are $\{P_1, P_2, \ldots P_N\}$, an image finally synthesized is P. It is assumed that an original static scene is $s_i$. In a continuous shooting process, each $s_i$ is the same as there is no movement of the scene. It is set that s and $n_i$ are noises in an image finally synthesized, where n is a random noise introduced by a photographing equipment, and a satisfied expected value of the random noise is 0, and variance is a normal distribution of $\sigma^2$. This formula applies:

$$P_i = s_i + n_i;$$

$$P = \frac{1}{N}\sum_{i=1}^{N} P_i = \frac{1}{N}\sum_{i=1}^{N} s + \frac{1}{N}\sum_{i=1}^{N} n_i = s + n;$$

$$n = \frac{1}{N}\sum_{i=1}^{N} n_i.$$

It is assumed that the variance in the image finally synthesized is D (n). The variance is the normal distribution of $\sigma^2$, and N is a constant in the calculation process, thus:

$$D(n_i) = \sigma^2;$$

$$D(n) = D\left(\frac{1}{N}\sum_{i=1}^{N} n_i\right) = \frac{1}{N^2}D\left(\sum_{i=1}^{N} n_i\right) = \frac{1}{N^2}\sum_{i=1}^{N} D(n_i) = \frac{1}{N^2}\sum_{i=1}^{N} \sigma^2 = \frac{1}{N^2}\sigma^2.$$

After N images in one static scene are overlapped and averaged, the noise power of the images is 1/N of the original. By carrying out a synthesis on the images continuously shot using an average noise power, a large amount of noises caused by the environmental background is effectively inhibited, thus a final image with good quality is obtained.

In the above embodiment, preferably, the imaging device further includes a collection unit, which collects a reference image of the object.

In the embodiment, the imaging quality under the weak light environment is further optimized, by collecting the reference image of the object and self-adapting of the brightness in the shooting scene.

In the above embodiment, preferably, the determination unit further determines an average brightness value and a mean grayscale value of the reference image. The determination unit further constructs a fraction which has a numerator of the mean grayscale value and has a denominator of the average brightness value, rounds the fraction to obtain an integer, and determines the integer as the number of the images continuously shot of the object to be shot.

In the embodiment, another method of determining a number N of the images continuously shot is provided. An image is shot before continuous shooting, where the image is taken as a reference image. The average brightness value L of the reference image is calculated. A formula N=[M/L] is used, where [M/L] is a rounding operation, and M is ½ of a grayscale level of the reference image. For example, grayscale ranges from 0 to 255. The number of the images continuously shot is N=11, when M=128, and L=12. A photographing system normally adjusts the brightness of the weak light image to be M/L times, thus, [M/L] images continuously shot are needed to reduce the noise to the original level, and to avoid interference such as noise amplification during imaging.

The third embodiment of the present disclosure further provides a terminal, which includes the imaging device as mentioned above.

The above embodiments determine a number of images for continuously shooting on an object to be shot according to a relation between an ambient background brightness, a preset brightness and the number of images. The embodiments further carry out a noise reduction process on the images, to complete the imaging process. The embodiments process the images continuously shot, thus, an original amount of information in the images is expanded, an image definition is prevented from being reduced in the noise reduction process, and a high-quality image can be achieved even under a weak light condition.

DETAILED DESCRIPTION

In order to understand the above objects, features and advantages of the present disclosure more clearly, further detailed description of the present disclosure is described in the following with reference to the accompanying drawings and the specific implementation embodiment. It should be noted that under the condition that no conflict exists, the embodiments of the present disclosure and the features in the embodiments can be combined with each other.

In the following description, numerous specific details are set forth in order to provide a thorough understanding of the present disclosure. The third mode that is different from the following description can also be adopted. Thus, the protection scope of the present application is not limited by the embodiments disclosed below.

Figure 1:
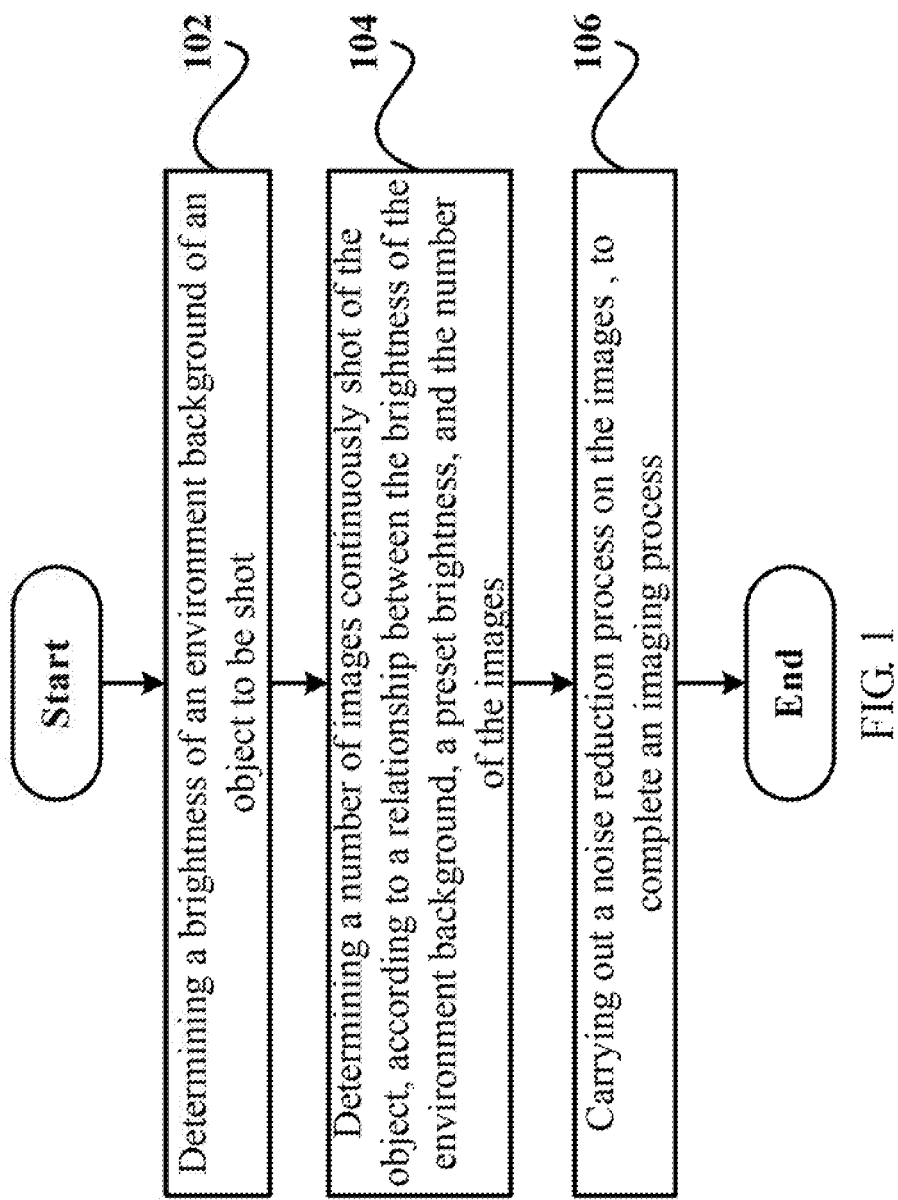
FIG. 1 is a schematic flow chart of an imaging method according to an embodiment of the present disclosure.

FIG. 1 is a schematic flow chart of an imaging method according to an embodiment of the present disclosure.

As shown in FIG. 1, an imaging method according to an embodiment of the present disclosure includes: step 102, determining a brightness of an environment background of an object to be shot; step 104, determining a number of images continuously shot on the object, according to a relation between the brightness of the environment background, a preset brightness, and the number of the images; step 106, carrying out a noise reduction process on the images, to complete an imaging process.

In the embodiment, the number of the images continuously shot is determined according to the relation between the brightness of the environment background, the preset brightness, and the number of images. The noise reduction process is carried out on the images continuously shot, to complete the imaging process. By processing the images continuously shot, an original amount of information in the images can be expanded, an image definition can be prevented from being reduced in the noise reduction process. Thus, a high-quality image can be achieved even under a weak light condition.

In the above embodiment, preferably, before determining a brightness of an environment background of an object, the imaging method further includes: presetting a negative correlation between the brightness of the environment background and the number of the images; and storing the negative correlation.

In the embodiment, the negative correlation refers to a change of directions of two phenomena opposite to each other. The brightness of the environment background and the number of the images continuously shot being in a negative correlation means that, the weaker the light, the higher the brightness amplification ratio, the greater the amount of noise, and the larger the number of images to be shot. When the number of the images is great enough, loss of image information quantity is avoided.

In the embodiment, preferably, carrying out a noise reduction process on the images, to complete an imaging process includes: computing an average noise power of the images, to complete the noise reduction process; and synthesizing the images according to the average noise power, to complete the imaging process.

In the embodiment, it is assumed that the number of the images continuously shot is N, the images continuously shot are $\{P_1, P_2, \ldots P_N\}$, an image finally synthesized is P. It is assumed that an original static scene is $s_i$. In a continuous shooting process, each $s_i$ is the same as there is no movement of the scene. It is set that s and $n_i$ are noises in an image finally synthesized, where n is a random noise introduced by a photographing equipment, and a satisfied expected value of the random noise is 0, and variance is a normal distribution of $\sigma^2$. This formula applies:

$$P_i = s_i + n_i;$$

$$P = \frac{1}{N}\sum_{i=1}^{N} P_i = \frac{1}{N}\sum_{i=1}^{N} s + \frac{1}{N}\sum_{i=1}^{N} n_i = s + n;$$

$$n = \frac{1}{N}\sum_{i=1}^{N} n_i.$$

It is assumed that the variance in the image finally synthesized is D (n). The variance is the normal distribution of $\sigma^2$, and N is a constant in the calculation process, thus:

$$D(n_i) = \sigma^2;$$

$$D(n) = D\left(\frac{1}{N}\sum_{i=1}^{N} n_i\right) = \frac{1}{N^2} D\left(\sum_{i=1}^{N} n_i\right) = \frac{1}{N^2}\sum_{i=1}^{N} D(n_i) = \frac{1}{N^2}\sum_{i=1}^{N} \sigma^2 = \frac{1}{N^2}\sigma^2.$$

After N images in one static scene are overlapped and averaged, the noise power of the images is 1/N of the original. By carrying out a synthesis on the images continuously shot using an average noise power, a large amount of noises caused by the environmental background is effectively inhibited, thus a final image with good quality is obtained.

The above embodiment, preferably before determining a brightness of an environment background of an object to be shot, further includes: collecting a reference image of the object.

In the embodiment, the imaging quality under the weak light environment is further optimized, by collecting the reference image of the object and self-adapting of the brightness in the shooting scene.

In the above embodiment, preferably determining a number of images continuously shot of the object, according to a relation between the brightness of the environment background, a preset brightness, and the number of the images, includes: determining an average brightness value and a mean grayscale value of the reference image; constructing a fraction which has a numerator of the mean grayscale value and has a denominator of the average brightness value, rounding the fraction to obtain an integer, and determining the integer as the number of the images continuously shot of the object to be shot.

In the embodiment, another method of determining the number N of the images continuously shot is provided. An image is shot before continuous shooting, where the image is taken as a reference image. The average brightness value L of the reference image is calculated. A formula N=[M/L] is used, where [M/L] is a rounding operation, and M is ½ of a grayscale level of the reference image. For example, grayscale ranges from 0 to 255. The number of the images continuously shot is N=11, when M=128, and L=12. A photographing system normally adjusts the brightness of the weak light image to be M/L times, thus, [M/L] images continuously shot are needed to reduce the noise to the original level, and to avoid interference such as noise amplification during imaging.

Figure 2:
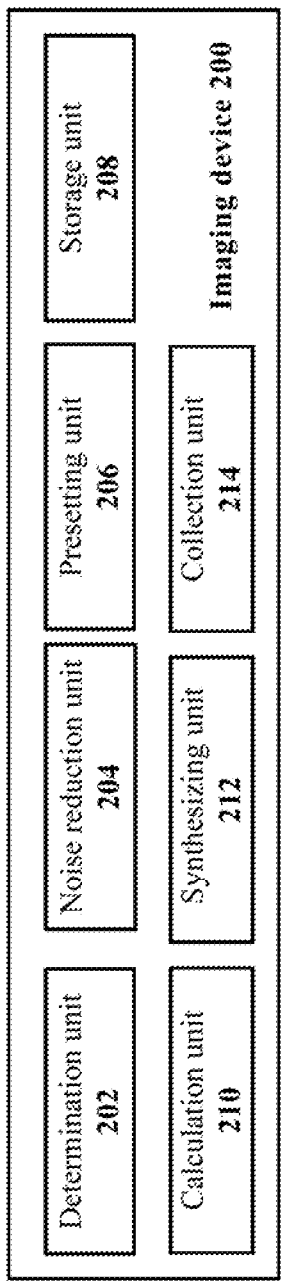
FIG. 2 is a schematic block diagram of an imaging device according to an embodiment of the present disclosure.

FIG. 2 is a schematic block diagram of an imaging device according to an embodiment of the present disclosure.

As shown in FIG. 2, an imaging device 200 according to an embodiment of the present disclosure includes a determination unit 202, which determines a brightness of an environment background of an object to be shot. The determination unit 202 further determines a number of images continuously shot on the object, according to a relation between the brightness of the environment background, a preset brightness, and the number of the images. The imaging device 200 further includes a noise reduction unit 204, which carries out a noise reduction process on the images, to complete an imaging process.

In the embodiment, the number of the images continuously shot is determined according to the relation between the brightness of the environment background, the preset brightness, and the number of images. The noise reduction process is carried out on the images continuously shot, to complete the imaging process. By processing the images continuously shot, an original amount of information in the images can be expanded, an image definition can be prevented from being reduced in the noise reduction process. Thus, a high-quality image can be achieved even under a weak light condition.

In the above embodiment, preferably, the imaging device 200 further includes a presetting unit 206, which presets a negative correlation between the brightness of the environment background and the number of the images; and storing the negative correlation.

In the embodiment, the negative correlation refers to a change of directions of two phenomena opposite to each other. The brightness of the environment background and the number of the images continuously shot being in a negative correlation means that, the weaker the light, the higher the brightness amplification ratio, the greater the amount of noise, and the larger the number of images to be shot. When the number of the images is great enough, loss of image information quantity is avoided.

In the embodiment, preferably, the imaging device 200 further includes a calculation unit 210, which computes an average noise power of the images, to complete the noise reduction process. The imaging device 200 further includes a synthesizing unit 212, which synthesizes the images according to the average noise power, to complete the imaging process.

In the embodiment, it is assumed that the number of the images continuously shot is N, the images continuously shot are $\{P_1, P_2, \ldots P_N\}$, an image finally synthesized is P. It is assumed that an original static scene is $s_i$. In a continuous shooting process, each $s_i$ is the same as there is no movement of the scene. It is set that s and $n_i$ are noises in an image finally synthesized, where n is a random noise introduced by a photographing equipment, and a satisfied expected value of the random noise is 0, and variance is a normal distribution of $\sigma^2$. This formula applies:

$$P_i = s_i + n_i;$$

$$P = \frac{1}{N}\sum_{i=1}^{N} P_i = \frac{1}{N}\sum_{i=1}^{N} s + \frac{1}{N}\sum_{i=1}^{N} n_i = s + n;$$

$$n = \frac{1}{N}\sum_{i=1}^{N} n_i.$$

It is assumed that the variance in the image finally synthesized is D (n). The variance is the normal distribution of $\sigma^2$, and N is a constant in the calculation process, thus:

$$D(n_i) = \sigma^2;$$

$$D(n) = D\left(\frac{1}{N}\sum_{i=1}^{N} n_i\right) = \frac{1}{N^2} D\left(\sum_{i=1}^{N} n_i\right) = \frac{1}{N^2}\sum_{i=1}^{N} D(n_i) = \frac{1}{N^2}\sum_{i=1}^{N}\sigma^2 = \frac{1}{N^2}\sigma^2.$$

After N images in one static scene are overlapped and averaged, the noise power of the images is 1/N of the original. By carrying out a synthesis on the images continuously shot using an average noise power, a large amount of noises caused by the environmental background is effectively inhibited, thus a final image with good quality is obtained.

In the above embodiment, preferably, the imaging device further includes a collection unit, which collects a reference image of the object.

In the embodiment, the imaging quality under the weak light environment is further optimized, by collecting the reference image of the object and self-adapting of the brightness in the shooting scene.

In the above embodiment, preferably, the determination unit 202 further determines an average brightness value and a mean grayscale value of the reference image. The determination unit 202 further constructs a fraction which has a numerator of the mean grayscale value and has a denominator of the average brightness value, rounds the fraction to obtain an integer, and determines the integer as the number of the images continuously shot of the object to be shot.

In the embodiment, another method of determining a number N of the images continuously shot is provided. An image is shot before continuous shooting, where the image is taken as a reference image. The average brightness value L of the reference image is calculated. A formula N=[M/L] is used, where [M/L] is a rounding operation, and M is ½ of a grayscale level of the reference image. For example, grayscale ranges from 0 to 255. The number of the images continuously shot is N=11, when M=128, and L=12. A photographing system normally adjusts the brightness of the weak light image to be M/L times, thus, [M/L] images continuously shot are needed to reduce the noise to the original level, and to avoid interference such as noise amplification during imaging.

Figure 3:
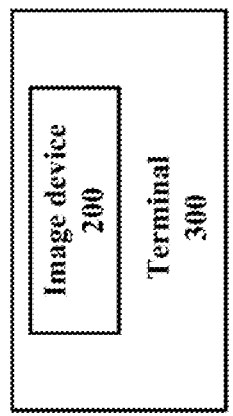
FIG. 3 is a schematic block diagram of a terminal according to an embodiment of the present disclosure.

FIG. 3 is a schematic block diagram of a terminal according to an embodiment of the present disclosure.

As shown in FIG. 3, a terminal 300 according to an embodiment of the present disclosure includes an imaging device 200 as mentioned in any of the embodiments above.

Figure 4:
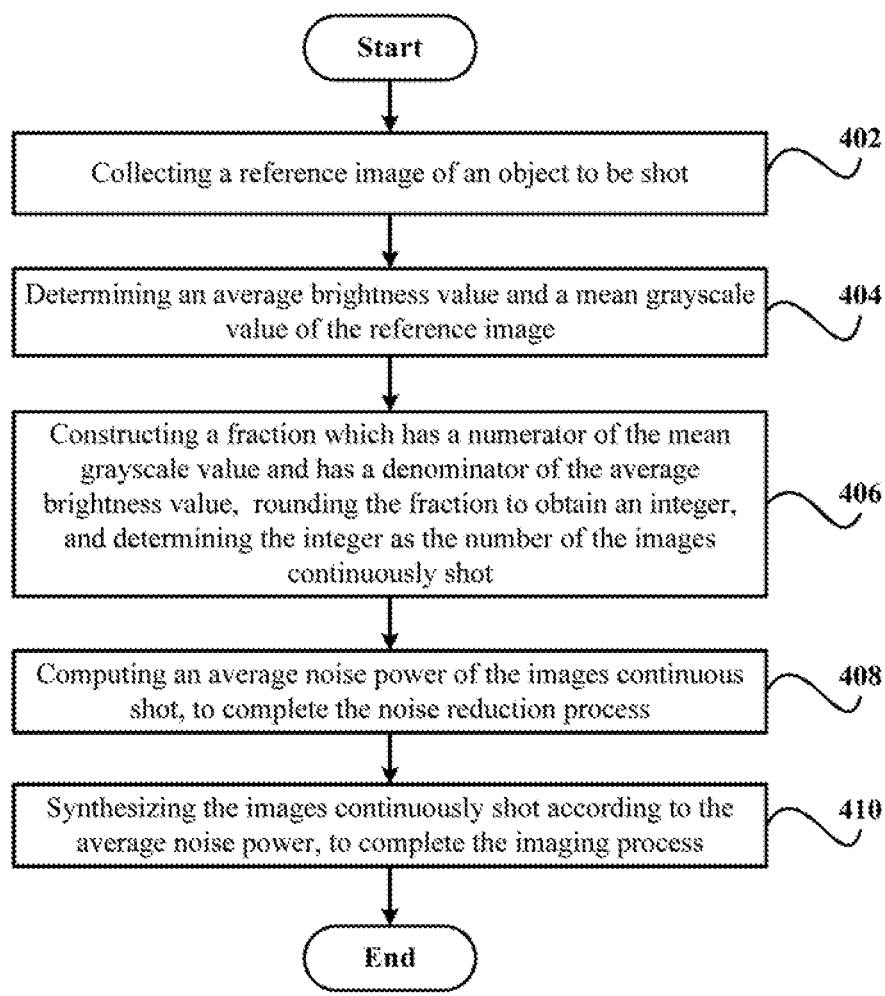
FIG. 4 is a schematic flow chart of an imaging method according to another embodiment of the present disclosure.

FIG. 4 is a schematic flow chart of an imaging method according to another embodiment of the present disclosure.

As shown in FIG. 4, an imaging method according to another embodiment of the present disclosure includes: step 402, collecting a reference image of an object to be shot; step 404, determining an average brightness value and a mean grayscale value of the reference image; step 406, constructing a fraction which as a numerator of the mean grayscale value and has a denominator of the average brightness value, rounding the fraction to obtain an integer and determining the integer as the number of the images continuously shot of the object to be shot; step 408, computing an average noise power of the images continuously shot, to complete the noise reduction process; step 410, synthesizing the images continuously shot according to the average noise power, to complete the imaging process.

Figure 5:
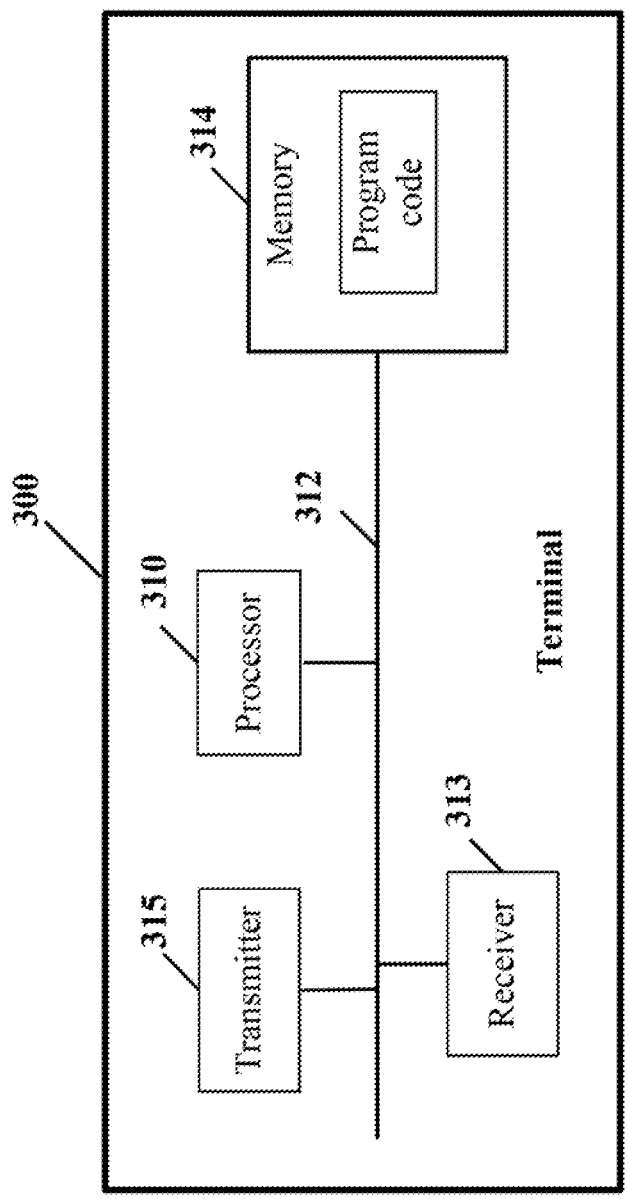
FIG. 5 is a schematic block diagram of a terminal according to another embodiment of the present disclosure.

FIG. 5 is a schematic block diagram of a terminal according to another embodiment of the present disclosure. The terminal 300 in the embodiment of the present disclosure may be of different types of electronic devices, such as, an intelligent mobile phone, a tablet computer, a handheld computer, mobile internet equipment and a personal digital assistant, a media player, an intelligent television, an intelligent watch, intelligent glasses, an intelligent bracelet and the like. As shown in FIG. 5, the terminal 300 in the embodiment of the present disclosure includes: at least one processor 310, such as a CPU, at least one receiver 313, at least one memory 314, at least one transmitter 315, and at least one communication bus 312. The communication bus 312 is used for realizing connection communication between components as mentioned above. The receiver 313 and the transmitter 315 can be wired transmission ports, and can also be wireless equipment, such as an antenna device, and are used for carrying out data communication with other equipment. The memory 314 can be a high-speed RAM memory or a non-volatile memory), such as at least one magnetic disk storage.

The processor 310 can execute the operating system of the terminal 300 and various types of applications, program codes, and the like, for example, each unit including the determination unit 202, the noise reduction unit 204, the presetting unit 206 and the storage unit 208, the calculation unit 210, the synthesizing unit 212, the acquisition unit 214, installed in the terminal 300.

Program code is stored in the memory 314. The processor 310 can call the program code stored in the memory 314 through the communication bus 312, to execute related functions. For example, each of the units described in FIG. 2 (e.g. the determination unit 202, the noise reduction unit 204, the presetting unit 206, the storage unit 208, the calculation unit 210, the synthesizing unit 212, the acquisition unit 214, and the like) is a program code stored in the memory 314 and is executed by the processor 310, so that the function of each unit can be executed to realize the processing of imaging.

In one embodiment of the present disclosure, the memory 314 stores a plurality of instructions. The plurality of instructions are executed by the processor 310 to realize an imaging method. The processor 310 determines a brightness of an environment background of an object to be shot. The processor 310 determines a number of images continuously shot of the object, according to a relation between the brightness of the environment background, a preset brightness, and the number of the images continuously shot. The processor 310 carries out a noise reduction process on the images continuously shot of the object, to complete an imaging process.

In a further embodiment, before the processor 310 determines a brightness of an environment background of an object to be shot, the processor 310 presets a negative correlation between the brightness of the environment background and the number of the images continuously shot; and stores the negative correlation.

In a further embodiment, the processor 310 carries out a noise reduction process on the images continuously shot of the object to complete an imaging process includes: the processor 310 computes an average noise power of the images, to complete the noise reduction process; and the processor 310 synthesizing the images according to the average noise power, to complete the imaging process.

In a further embodiment, before determining a brightness of an environment background of an object to be shot, the processor 310 collects a reference image of the object.

In a further embodiments, determining a number of images continuously shot of the object, according to a relation between the brightness of the environment background, a preset brightness, and the number of the images, includes: the processor 310 determines an average brightness value and a mean grayscale value of the reference image; the processor 310 constructs a fraction which has a numerator of the mean grayscale value and has a denominator of the average brightness value, rounds the fraction to obtain an integer, and determines the integer as the number of the images continuously shot.

The implementations of the processor 310 for the instructions can refer to descriptions of related steps in the embodiments of FIG. 1, FIG. 4 of the present disclosure, thus, are not described in detail herein.

The embodiments of the present disclosure are described in detail with reference to the accompanying drawings above. In consideration of the technical problem of how to restrain noise in a weak light environment in related technologies, the present disclosure provides a novel imaging scheme, which determines a number of the images continuously shot of the object to be shot according to a relation between an ambient background brightness, a preset brightness and the number of the images continuously shot. The present disclosure further carries out a noises reduction process on the images continuously shot, to complete the imaging process. The present disclosure processes the plurality of images continuously shot. Thus, the original information amount of the images is expanded, an image definition is prevented from being reduced in the noise restrain process, and the effect of obtaining a high-quality image can be achieved even under a weak light condition.

The above descriptions are only preferred embodiments of the present disclosure, and are not intended to limit the present disclosure. For those skilled in the art, various changes can be made. Any modifications made without departing from the spirit and principle of the present disclosure, equivalent replacement, improvement and the like are all included in the protection scope of the present disclosure.

What is claimed is:

1. An imaging method, comprising:
   presetting a negative correlation between a brightness of an environment background and a number of images continuously shot, and store the negative correlation;
   collecting a reference image of the object;
   determining a brightness of an environment background of an object to be shot;
   determining a number of images continuously shot of the object, according to a relation between the brightness of the environment background, a preset brightness, and the number of the images, comprising:
      determining an average brightness value and a mean grayscale value of the reference image;
      constructing a fraction which has a numerator of the mean grayscale value and has a denominator of the average brightness value, rounding the fraction to obtain an integer, and determining the integer as the number of the images continuously shot;
   carrying out a noise reduction process on the images continuously shot, to complete an imaging process.

2. The imaging method according to claim 1, wherein carrying out a noise reduction process on the images continuously shot, to complete an imaging process comprising:
   computing an average noise power of the images continuously shot, to complete the noise reduction process; and
   synthesizing the images continuously shot according to the average noise power, to complete the imaging process.

3. A terminal, comprising:
   at least one processor; and
   a storage device that stores one or more programs, which when executed by the at least one processor, cause the at least one processor to:
   preset a negative correlation between a brightness of an environment background and a number of images continuously shot; and store the negative correlation;
   collect a reference image of the object;
   determine a brightness of an environment background of an object to be shot;
   determine a number of images continuously shot of the object, according to a relation between the brightness of the environment background, a preset brightness, and the number of the images, comprising:
      determining an average brightness value and a mean grayscale value of the reference image;
      constructing a fraction which has a numerator of the mean grayscale value and has a denominator of the average brightness value, rounding the fraction to obtain an integer, and determining the integer as the number of the images continuously shot;
   carry out a noise reduction process on the images continuously shot, to complete an imaging process.

4. The terminal according to claim 3, wherein the one or more programs, which when executed by the at least one processor, further cause the at least one processor to:
   compute an average noise power of the images continuously shot, to complete the noise reduction process;
   synthesize the images continuously shot according to the average noise power, to complete the imaging process.

5. A non-volatile memory medium having stored thereon instructions that, when executed by at least one processor of a terminal, causes the at least one processor to perform an imaging method, which comprises:
   presetting a negative correlation between a brightness of an environment background and a number of images continuously shot, and store the negative correlation;
   collecting a reference image of the object;
   determining a brightness of an environment background of an object to be shot;
   determining a number of images continuously shot of the object, according to a relation between the brightness of the environment background, a preset brightness, and the number of the images, comprising:
      determining an average brightness value and a mean grayscale value of the reference image;
      constructing a fraction which has a numerator of the mean grayscale value and has a denominator of the average brightness value, rounding the fraction to obtain an integer, and determining the integer as the number of the images continuously shot;
   carrying out a noise reduction process on the images continuously shot, to complete an imaging process.

6. The non-volatile memory medium according to claim 5, wherein carrying out a noise reduction process on the images continuously shot, to complete an imaging process comprising:
   computing an average noise power of the images continuously shot, to complete the noise reduction process; and synthesizing the images continuously shot according to the average noise power, to complete the imaging process.

* * * * *